United States Patent
Peterson et al.

(10) Patent No.: US 11,368,006 B2
(45) Date of Patent: *Jun. 21, 2022

(54) CLIP FOR FLAT WIRING AND ROBOTIC ASSEMBLY

(71) Applicant: APTIV TECHNOLOGIES LIMITED, St. Michael (BB)

(72) Inventors: David R. Peterson, Aurora, OH (US); Joseph Sudik, Jr., Niles, OH (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 17/063,121

(22) Filed: Oct. 5, 2020

(65) Prior Publication Data

US 2021/0135441 A1 May 6, 2021

Related U.S. Application Data

(63) Continuation of application No. 16/670,052, filed on Oct. 31, 2019, now Pat. No. 10,797,477.

(51) Int. Cl.
*H02G 3/32* (2006.01)
*B60R 16/02* (2006.01)

(52) U.S. Cl.
CPC ........... *H02G 3/32* (2013.01); *B60R 16/0215* (2013.01)

(58) Field of Classification Search
CPC ....................................................... H02G 3/32
USPC ....................................................... 174/72 A
See application file for complete search history.

(56) References Cited

U.S. PATENT DOCUMENTS

| | | | | |
|---|---|---|---|---|
| 4,840,345 | A * | 6/1989 | Neil | F16L 3/12 24/16 PB |
| 4,918,261 | A * | 4/1990 | Takahashi | F16L 3/08 174/135 |
| 5,626,316 | A | 5/1997 | Smigel et al. | |
| 7,063,561 | B2 | 6/2006 | Pabst | |
| 7,144,256 | B2 | 12/2006 | Pabst et al. | |
| 7,232,334 | B2 | 6/2007 | Shimizu et al. | |
| 8,157,222 | B1 * | 4/2012 | Shirey | H02G 3/32 248/74.1 |

(Continued)

FOREIGN PATENT DOCUMENTS

EP 0669627 B1 8/2002

OTHER PUBLICATIONS

Applicant Submitted Prior Art available prior to Oct. 31, 2019.
European Search Report for European Application No. 20201031.0 dated Mar. 12, 2021.

*Primary Examiner* — Stanley Tso

(74) *Attorney, Agent, or Firm* — RMCK Law Group, PLC

(57) ABSTRACT

A clip includes first and second portions that are joined to one another by a living hinge. A snap includes first and second coupling elements that are respectively provided on the first and second portions. The first and second coupling elements are decoupled from one another in an open clip position and are coupled to one another in a closed clip position. Each of the first and second portions define an elongated slot that extends through a width of the clip that has an open end and a closed end. The open ends face a same direction. Each of the first and second portions include a first and second spring respectively. The first and second springs face one another. The first and second springs are configured to clamp about a wiring in the closed clip position.

15 Claims, 6 Drawing Sheets

(56) References Cited

U.S. PATENT DOCUMENTS

| | | | |
|---|---|---|---|
| 9,048,563 B2 | 6/2015 | Miura et al. | |
| 2001/0054671 A1 | 12/2001 | Kondo | |
| 2007/0063111 A1* | 3/2007 | Alloway | B60R 16/0207 |
| | | | 248/71 |
| 2007/0066125 A1* | 3/2007 | Uenver | H01R 13/595 |
| | | | 439/459 |
| 2007/0082541 A1* | 4/2007 | Alloway | H01R 13/56 |
| | | | 439/492 |
| 2007/0215757 A1* | 9/2007 | Yuta | F16L 55/035 |
| | | | 248/68.1 |
| 2012/0104186 A1 | 5/2012 | Shirey et al. | |
| 2012/0168109 A1* | 7/2012 | Davidson | B22C 9/082 |
| | | | 164/15 |
| 2019/0081469 A1 | 3/2019 | Shea et al. | |
| 2019/0086358 A1 | 3/2019 | Hattori et al. | |

* cited by examiner

CLIP FOR FLAT WIRING AND ROBOTIC ASSEMBLY

CROSS-REFERENCE TO RELATED APPLICATIONS

This application is a continuation of U.S. Provisional application Ser. No. 16/670,052 filed on Oct. 31, 2019, and is incorporated herein by reference.

FIELD OF INVENTION

This disclosure relates to a clip suitable for using with flat wiring.

SUMMARY

In one exemplary embodiment, a clip includes first and second portions that are joined to one another by a living hinge. A snap includes first and second coupling elements that are respectively provided on the first and second portions. The first and second coupling elements are decoupled from one another in an open clip position and are coupled to one another in a closed clip position. Each of the first and second portions define an elongated slot that extends through a width of the clip that has an open end and a closed end. The open ends face a same direction. Each of the first and second portions include a first and second spring respectively. The first and second springs face one another. The first and second springs are configured to clamp about a wiring in the closed clip position.

In a further embodiment of any of the above, the clip is unitary molded plastic structure.

In a further embodiment of any of the above, the first and second springs are provided by resilient fixed beam structures with a flat portion that is configured to engage the wiring.

In a further embodiment of any of the above, each elongated slot defines two parallel interior walls.

In a further embodiment of any of the above, the first spring circumscribes a first opening that extends through a width of the first portion and the second spring circumscribes a second opening that extends through a width of the second portion.

In a further embodiment of any of the above, the first and second openings define a trapezoidal shape.

In a further embodiment of any of the above, each of the first legs support a first and second projection respectively that extend to a first and second face. The first projections are adjacent to the hinge. The second projections are adjacent to the snap. The first faces abut one another in the closed clip position. The second faces abut one another in the closed clip position.

In a further embodiment of any of the above, a relief notch is provided between the first and second projections and each of the springs.

In a further embodiment of any of the above, the clip extends a width direction, a length direction and a height direction. A clip height is greater than a clip width and less than a clip length. The clip includes an attachment feature that extends from the first portion in the height direction at least half of the clip height.

In a further embodiment of any of the above, the attachment extends from the second leg.

In a further embodiment of any of the above, the first coupling element is provided by one of a hook and a protrusion. The second coupling element is provided by the other of the hook and the protrusion.

In a further embodiment of any of the above, the clip includes a first bar that interconnects the first portions of multiple clips. A second bar interconnects the second portions of the multiple clips.

In a further embodiment of any of the above, a clip assembly includes multiple clips. The assembly further includes a sprue that interconnects multiple clips along a width direction. The sprue is configured to be removed during a clip manufacturing process.

In another exemplary embodiment, a wiring harness assembly includes a wiring harness that has multiple wires. Each wire has a conductor that is covered in insulation. The insulation includes webbing that interconnects the wires to one another. Each conductor is formed of a solid, non-stranded conductive material. Each of the conductors has a generally rectangular profile that have a width and a height. The width is at least twice the height. The wiring harness further includes the clip.

In another exemplary embodiment, a wiring harness clip includes first and second portions that are joined to one another by a living hinge. A snap includes first and second coupling elements respectively provided on the first and second portions. The first and second coupling elements are decoupled from one another in an open clip position and coupled to one another in a closed clip position. Each of the first and second portions include a spring that face one another. The springs are configured to clamp about a wiring in the closed clip position. Each spring is characterized as having a trapezoidal shape with a minor parallel portion that is configured to engage the wiring.

In a further embodiment of any of the above, the clip is a unitary molded plastic structure.

In a further embodiment of any of the above, the first and second portions each circumscribe a trapezoidal opening that extends through a width of the clip.

In a further embodiment of any of the above, each of the first and second portions supports a first and second projection respectively that extend to a first and second face. The first projections are adjacent to the hinge. The second projections are adjacent to the snap. The first faces abut one another in the closed clip position. The second faces abut one another in the closed clip position.

In a further embodiment of any of the above, a relief notch is provided between the first and second projections and each of the springs.

In another exemplary embodiment, a wire harness assembly includes wiring with multiple wires. Each wire has a conductor covered in insulation. The insulation includes webbing that interconnects the wires to one another. Each conductor is formed of a solid, non-stranded conductive material. Each of the conductors has a generally rectangular profile that have a width and a height. The width is at least twice the height. The wire harness assembly further includes the clip.

BRIEF DESCRIPTION OF THE DRAWINGS

The disclosure can be further understood by reference to the following detailed description when considered in connection with the accompanying drawings wherein.

DETAILED DESCRIPTION

Figure 1A:
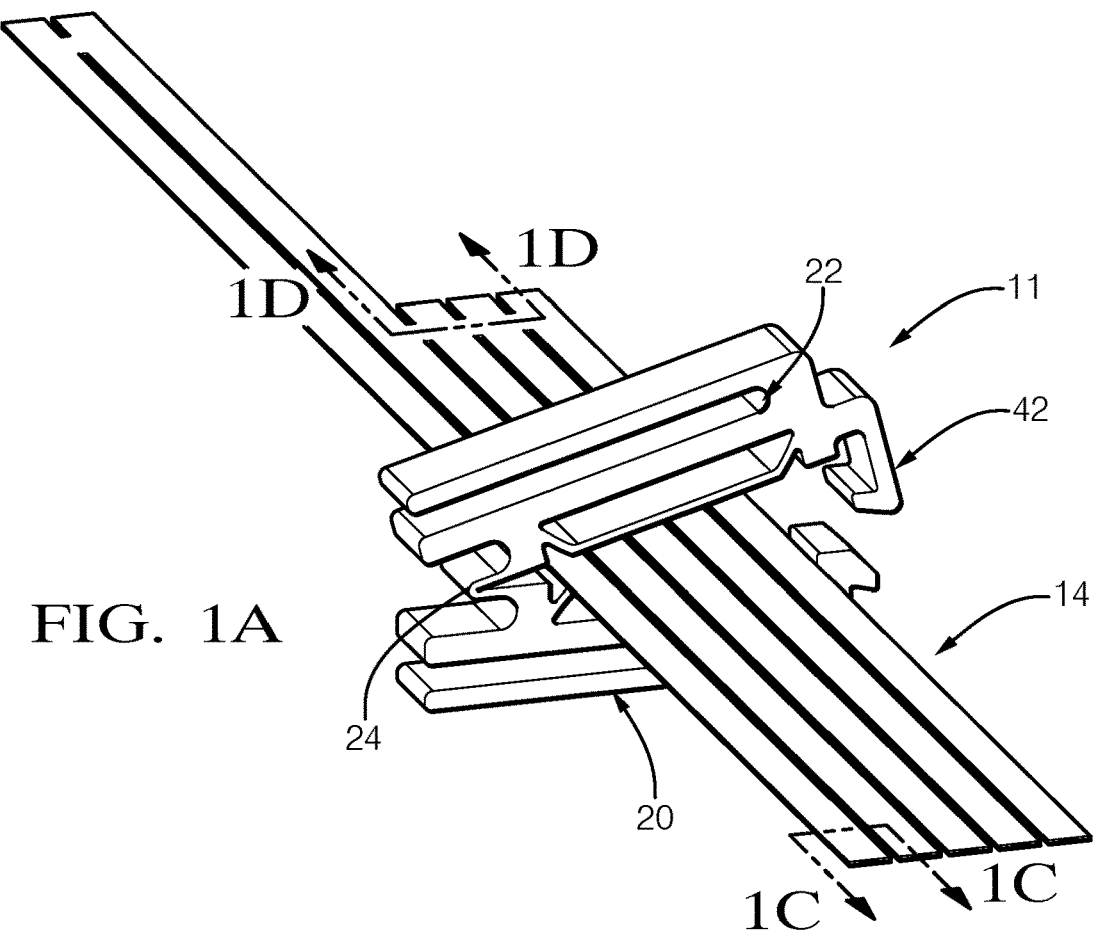
FIGS. 1A and 1B are respectively perspective views of a clip arranged about wiring in opened and closed positions.
Figure 1B:
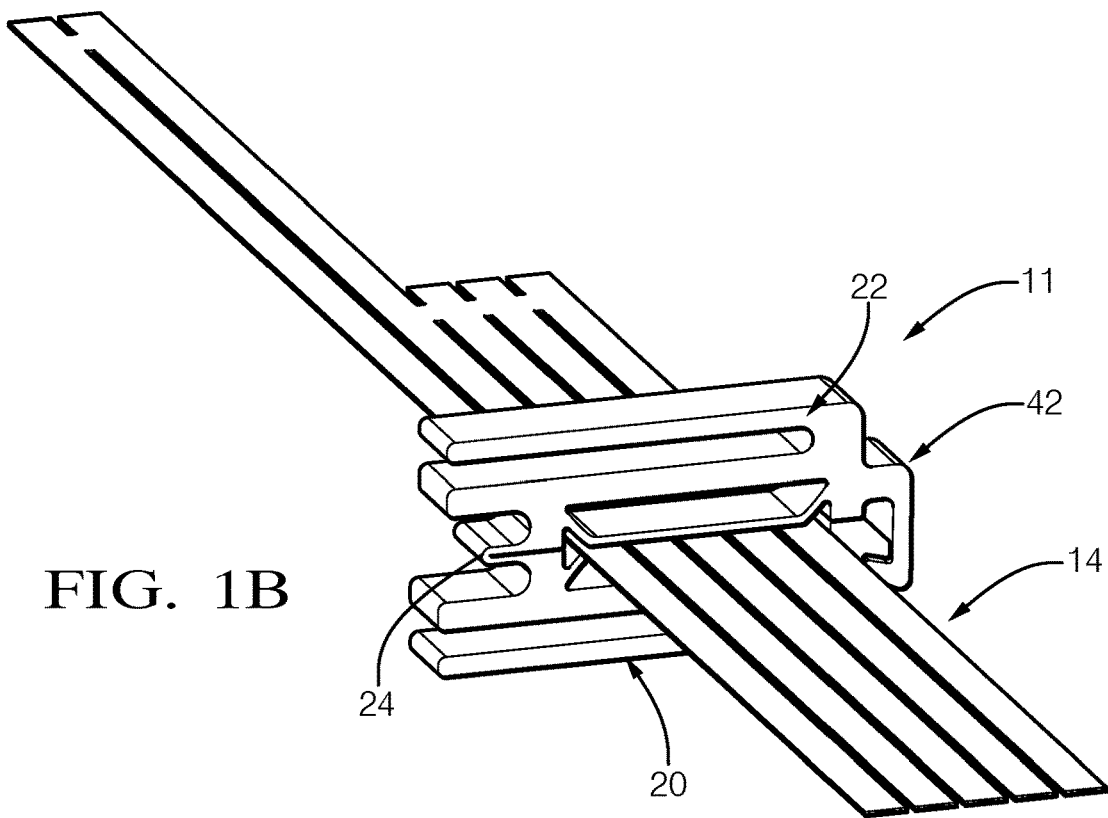
Figure 1C:
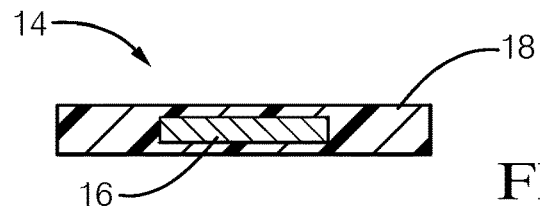
FIG. 1C is a cross-sectional view taken along line 1C-1C in FIG. 1A.
Figure 1D:
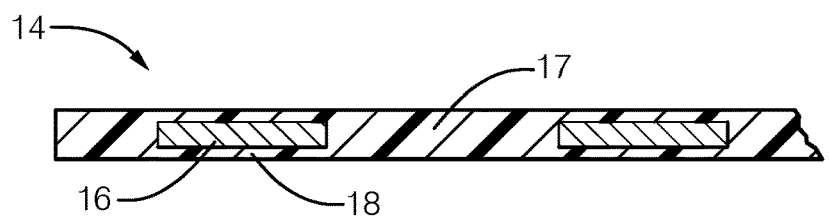
FIG. 1D is a cross-sectional view taken along line 1D-1D in FIG. 1A.

A clip 11 has opened and closed positions, respectively shown in FIGS. 1A and 1B, for use with a vehicle wiring harness, for example. A typical wiring harness includes one or more electrical connectors, which may be integrated with an electrical component such as a light, sensor, electrical connector, or other electrical device.

The clip 11 is to secure and support flat wiring having one or more wires. The disclosed clip 11 is designed to apply a clamping load to one or more groupings of wire without applying excessive force that could damage the wire's insulation. Accordingly, various thicknesses can be accommodated by the clip 11, enabling effective support of just one group of wires or more than one group of wires that are stacked one on top of the other.

The wiring 14 may include one or more wires, as shown in FIGS. 1A-1B. Each wire includes a relatively flat conductor 16 that is generally rectangular and is encased in a non-conductive, flexible plastic insulation 18 to provide a cross-sectional aspect ratio of at least 2:1 with respect to the width and the height. In some embodiments, the aspect ratio may be at least 3:1. In other embodiments, the aspect ratio may be at least 5:1. The conductor 16 is provided by non-stranded electrically conductive material, such as a flat copper wire plated with tin. The adjacent wires may be interconnected with insulation material that forms webbing 17, which provides structurally integrity to the wiring 14 during handling.

The clip 11 is a unitary molded plastic structure that includes first and second portions 20, 22 joined to one another by a living hinge 24. A snap 42 is provided on an end of the clip 11 opposite the hinge 24 to retain the first and second portions 20, 22 in a closed position, as shown in FIG. 1B. The clip 11 extends a width direction, a length direction and a height direction. In the illustrated example, a clip height is greater than a clip width and is less than a clip length.

Figure 2A:
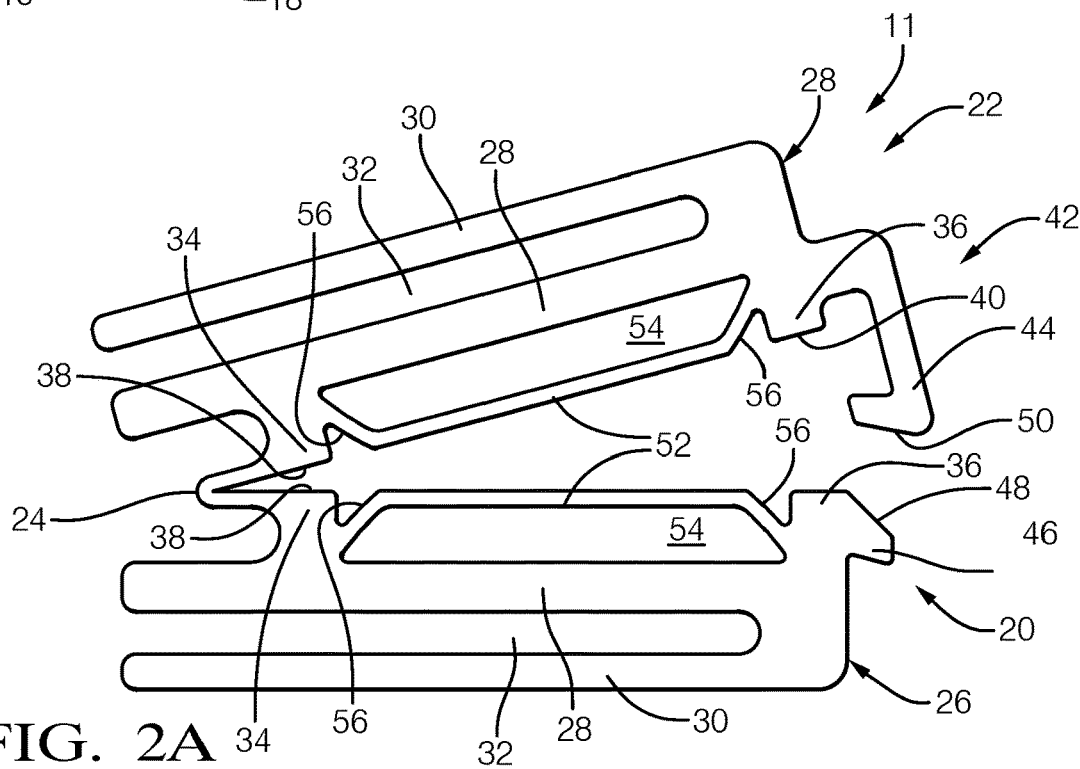
FIGS. 2A and 2B respectively are elevational views of the clip in the opened and closed positions.
Figure 2B:
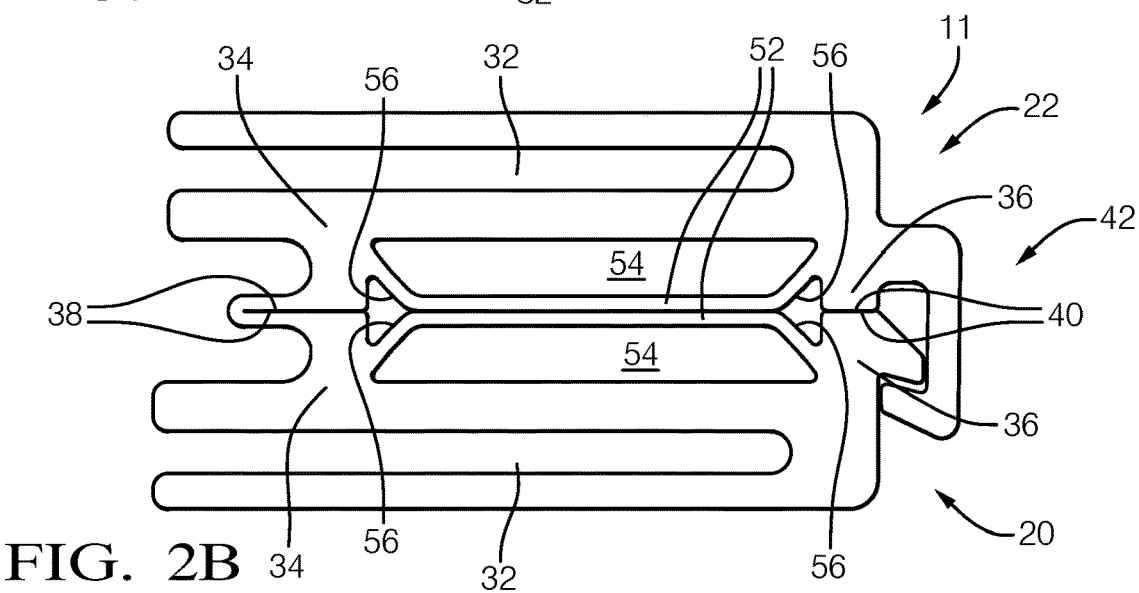

Referring to FIGS. 2A and 2B, each of the first and second portions 20, 22 is provided by a U-shaped portion 26 comprising a first leg 28 that is thicker in the height direction than an adjoining second leg 30. The U-shaped portion 26 extends through the width of the clip 11 and provides an open end and a closed end. The open ends of the first and second portions 20, 22 face the same direction. The first legs 28 provide two parallel interior walls. It should be understood that the legs may be the same thickness, if desired. An elongated slot 32 is provided in the length direction between the first and second legs 28, 30 of each of the first and second portions 20, 22. The spaced apart slots 32 provided by the first and second portions 20, 22 face the same direction and are adapted to receive robotic fingers that may be used to clamp and hold the clip 11 along with the rest of the wiring harness for insulation into a vehicle during an automated assembly procedure. The wiring harnesses may be oriented in specially adapted dunnage that is configured to position the slots 32 in a manner that enables a robot to pick up the wiring harness by the clips 11. Vision systems also may be used by the robot to locate the slots 32 for insertion of the robotic fingers.

Each of the first and second portions 20, 22 include a first projection 34 arranged near the hinge 24 that terminates in a first face 38. A second projection 36 is provided near the snap 42 on each of the first and second portions 20, 22. Each second projection 36 terminates in a second face 40. The first faces 38 abut one another and the second faces 40 abut one another with the clip 11 in the closed position (FIG. 2B). The first and second projection 34, 36 along with the thicker first legs 28 provide structural rigidity to the clip 11 in the closed position to prevent excessive deflection or loading that could be imparted onto the wiring 14 by the robotic fingers during handling.

The snap 42 includes first and second coupling elements respectively provided on the first and second portions 20, 22. The first and second coupling elements, e.g., hook 44 and protrusion 44 are decoupled from one another in an open clip position and coupled to one another in a closed clip position. In the example, the first portion includes the protrusion 46, the second portion includes the hook 44 to provide the snap 42. The protrusion 46 and hook 44 respectively include first and second ramped surfaces 48, 50 that cooperate with one another while closing the clip 11 to deflect the hook 44 outward before returning to a position beneath the protrusion 46 to the fastened, closed clip position.

A C-shaped retaining spring 52 is provided on each of the first and second portions 20, 22 between the first and second projections 34, 36 such that springs 52 face one another. These two springs provide resilient fixed beam structures. A flat surface is provided on the spring 52 to evenly clamp the various wires of the wiring 14. This is particularly desirable when there is no webbing between adjacent wires so that the loose wires are securely held by the clip 11. Each retaining spring 52 in combination with its first leg 28 defines an opening 54 that extends through the clip width and that is circumscribed about its entire periphery. In the example, the opening 54 has a trapezoidal shape with the minor parallel portion providing a portion of the spring 52 and engaging the wiring 14. Relief notches 56 are provided in either side of the retaining spring 52 adjacent to each of the first and second projections 34, 36. The relatively thin retaining spring 52 along with the opening 54 and relief notches 56 enable the retaining spring 52 to deflect enough to accommodate one or more bundles wiring 14 without applying excessive loads that would compromise the insulation 18.

Various attachment configurations may be used with the clip 11 to secure the clip and the supported wiring 14 to a vehicle structure. In the illustrated examples, aside from the snap 42 and the attachment feature, the clip 11 is symmetrical on either side of the living hinge 22. The clip 11 has an attachment extending from the first portion 20, for example, the second leg 30, in the height direction at least at least half of the clip height.

Figure 3:
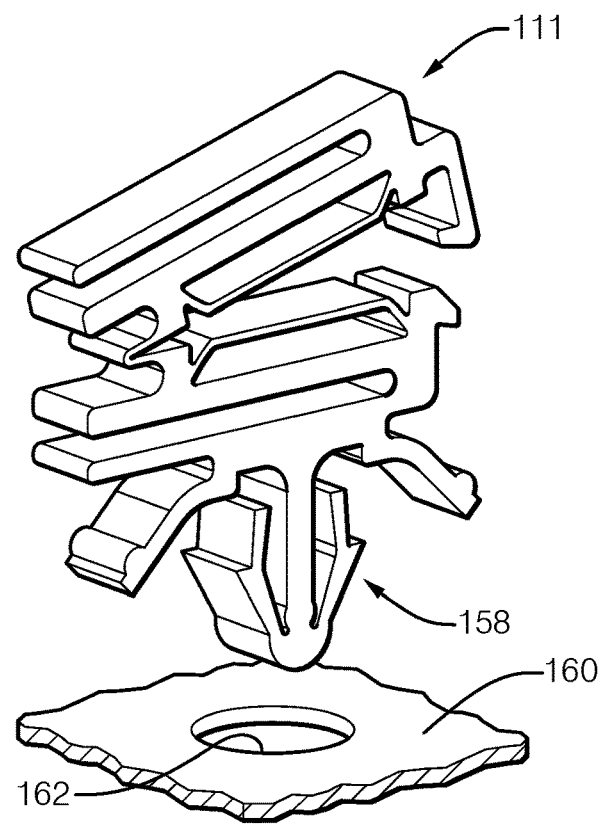
FIG. 3 is a perspective view of the clip with a first attachment style.
Figure 4:
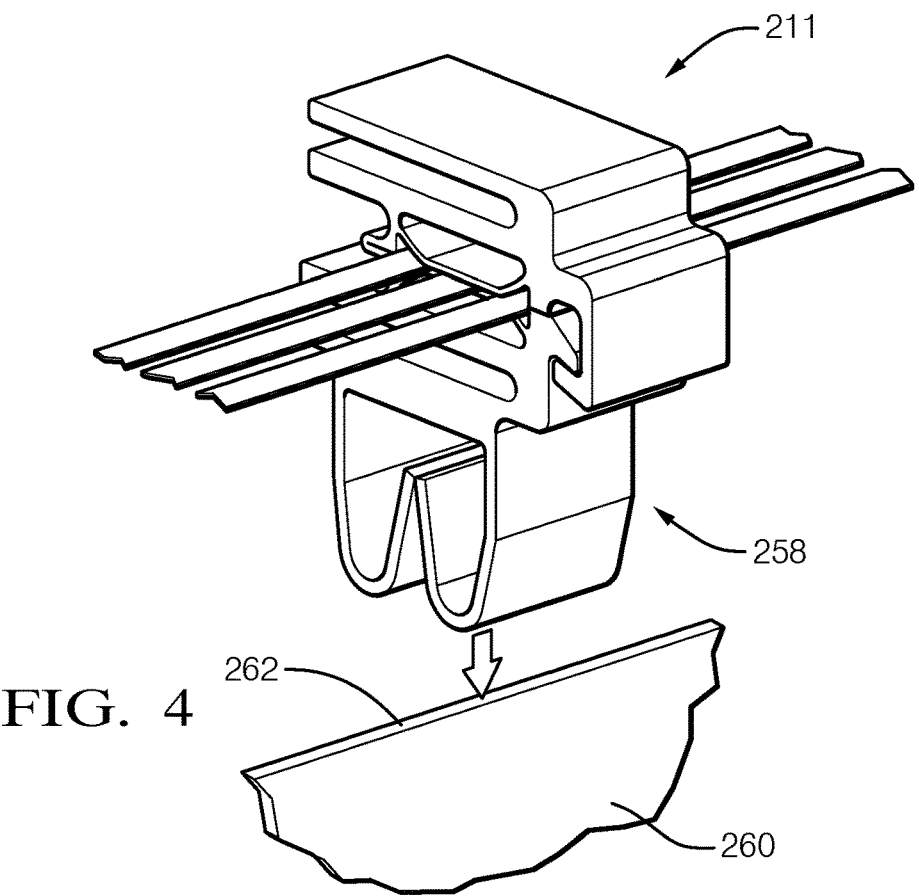
FIG. 4 is a perspective view of the clip with a second attachment style.
Figure 5:
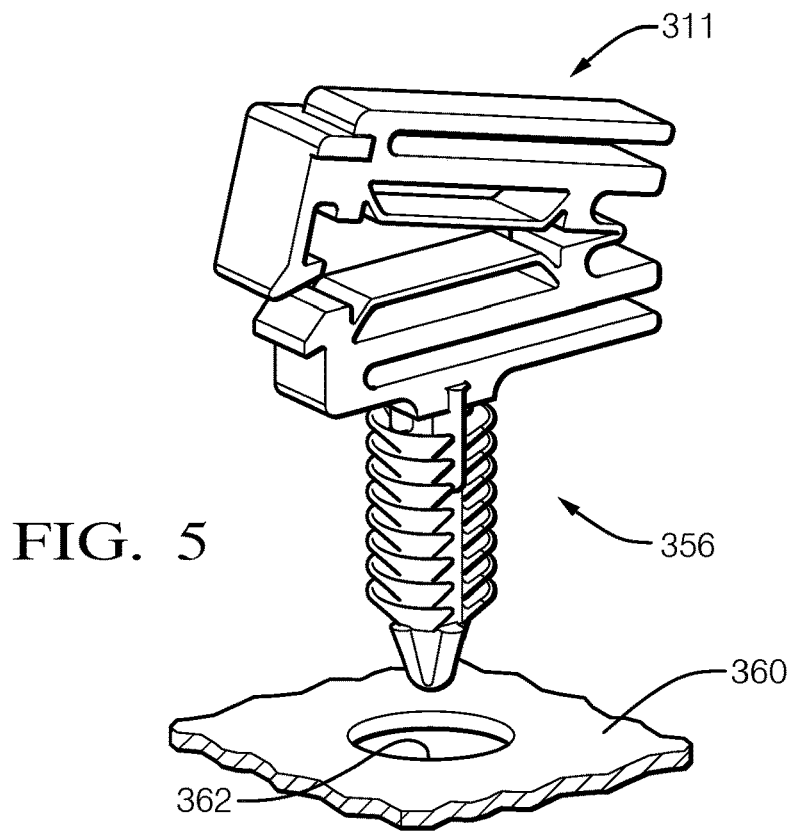
FIG. 5 is a perspective view of the clip with a third attachment style.

In the example shown in FIG. 3, the clip 111 includes an attachment 158 that has a barb suitable for inserting into a feature 162 such as a hole in a structure 160. The structure 160 could be sheet metal, trim, or any other structural component. Another clip 211 is shown in FIG. 4 that includes an attachment 258 providing facing hooks onto an edge 262 of a relatively thin structure. Clip 311 shown in FIG. 5 incorporates a fir tree-type-attachment 356 suitable for inserting into a hole 362 of a structure 360. Attachments other than those shown may also be used.

Figure 6B:
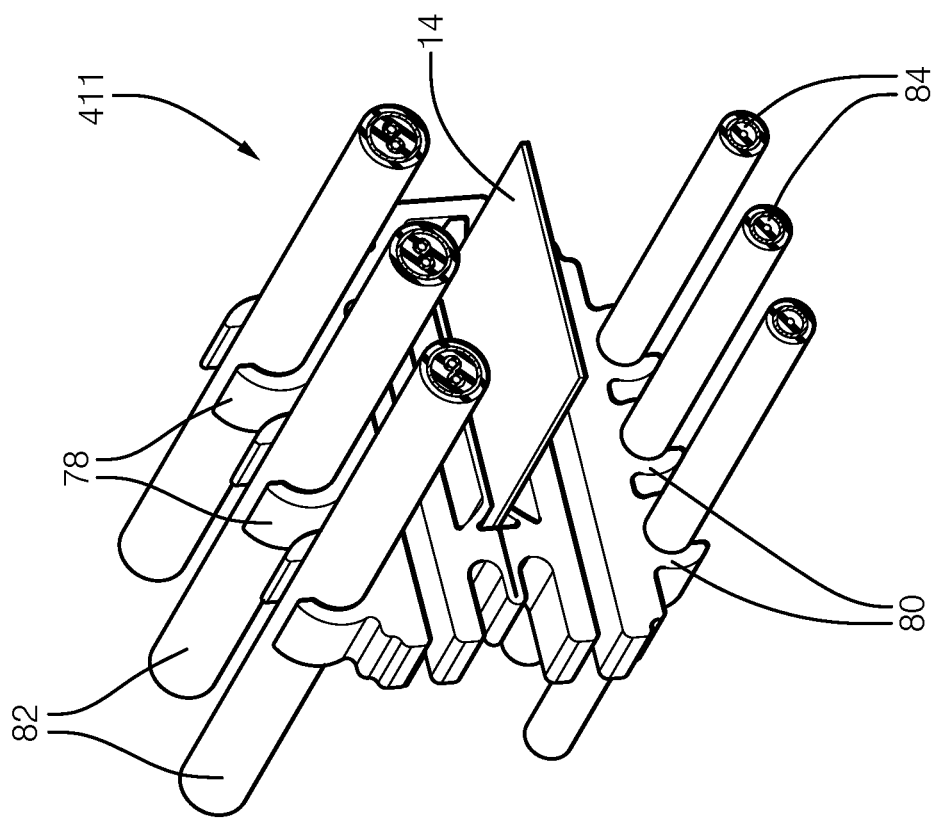
FIGS. 6A and 6B respectively are elevational and perspective views of a clip with additional wire holding features.
Figure 6A:
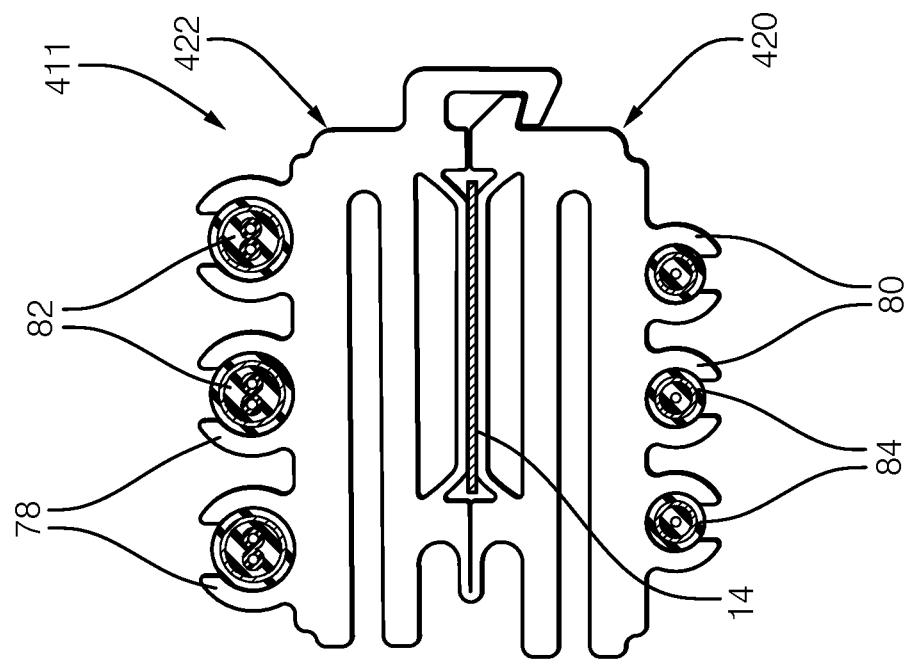

Another clip 411 is shown in FIGS. 6A and 6B. The clip 411 includes one or more C-shaped clip holding features 78, 80 that may be provided on either or both of the first and second portions 420, 422. Wires, such as conventional or high speed shielded data circuits 82, 84, or other components can be mounted to the holding features 78, 80. Thus, the clip 411 can be used to support other elements in addition to the wiring 14.

Figure 7B:
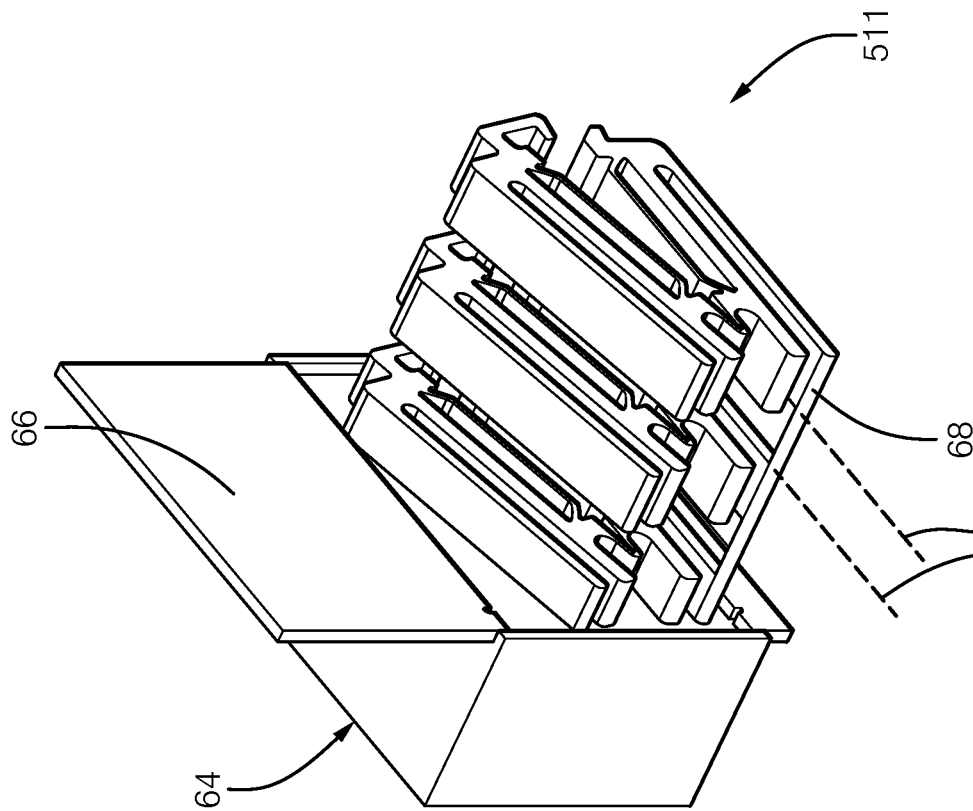
FIGS. 7A and 7B are perspective views of a molding machine used to form an array of clips.
Figure 7A:
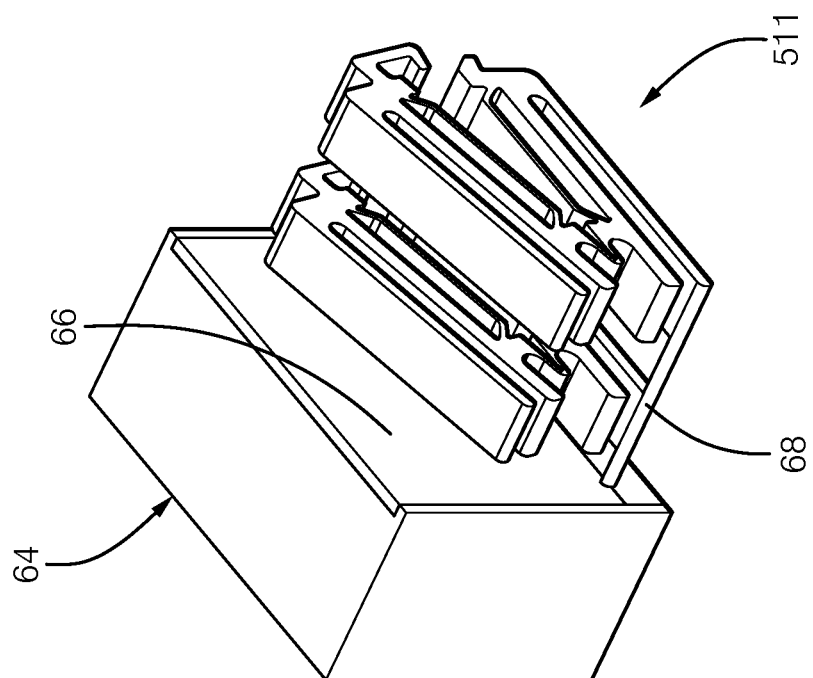

Multiple clips 511 may be formed using a molding machine 64 that forms an array of clips joined to one another by a sprue 68, as shown in FIGS. 7A and 7B. Each clip 511 is formed within an enclosed molding chamber, and a gate 66 is lifted to allow removal of the newly formed clip from the molding chamber. The sprue 68 may be removed at one or more cutlines 70 to provide discrete clips 511.

Figure 8:
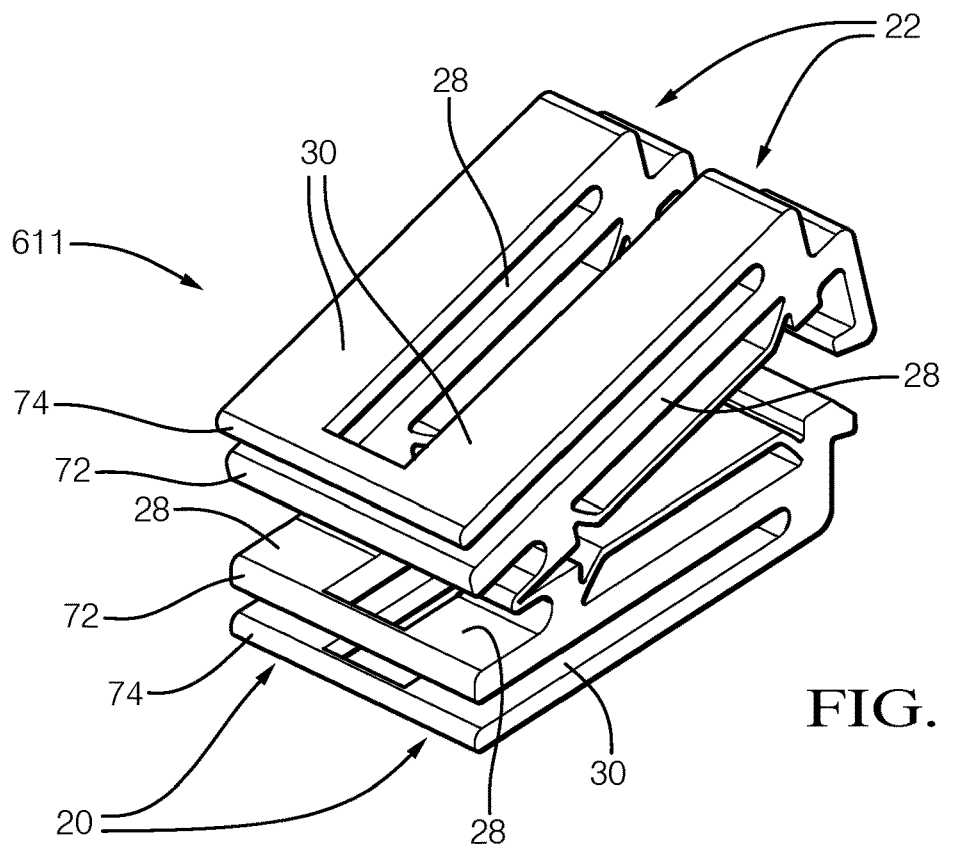
FIG. 8 is a perspective view of a multi-clip configuration.

Another arrangement is illustrated in FIG. 8 in which a multi-clip 511 is provided to enable greater support to the wiring where needed. In this example, first and second bars 72, 74 are used to join the first and second legs 28, 30 of each of the first and second portions 20, 22. Such an arrangement also enables better manipulation by robotic fingers during handling.

Additional example embodiments of are described below:

Example 1. A clip (11), comprising first and second portions (20, 22) joined to one another by a living hinge (24), a snap (42) including first and second coupling elements (44, 46) respectively provided on the first and second portions (20, 22), the first and second coupling elements (44, 46) decoupled from one another in an open clip position and coupled to one another in a closed clip position, wherein each of the first and second portions (20, 22) define an elongated slot (32) extending through a width of the clip (11) having an open end and a closed end, the open ends facing a same direction and wherein each of the first and second portions (20, 22) include a first and second spring respectively, the first and second springs (52) facing one another, the first and second springs (52) configured to clamp about a wiring (14) in the closed clip position.

Example 2. The clip (11) of example 1, wherein the clip (11) is unitary molded plastic structure.

Example 3. The clip (11) of example 1 or 2, wherein the first and second springs (52) are provided by resilient fixed beam structures with a flat portion that is configured to engage the wiring (14).

Example 4. The clip (11) of example 3, wherein the first spring circumscribes a first opening (54) extending through a width of the first portion (20) and the second spring circumscribes a second opening (54) extending through a width of the second portion (22).

Example 5. The clip (11) of any one of the previous examples, wherein each elongated slot (32) defines two parallel interior walls.

Example 6. The clip (11) of any one of the previous examples, wherein the first and second openings (54) define a trapezoidal shape.

Example 7. The clip (11) of any one of the previous examples, wherein each of the first legs (28) supports a first and second projection (34, 36) respectively extending to a first and second face (38, 40), the first projections (34) adjacent to the hinge (24), and the second projections (36) adjacent to the snap (42), the first faces (38) abutting one another in the closed clip position, and the second faces (40) abutting one another in the closed clip position.

Example 8. The clip (11) of any one of the previous examples, wherein a relief notch (56) is provided between the first and second projections (34, 36) and each of the springs (52).

Example 9. The clip (11) of any one of the previous examples, wherein the clip (11) extends a width direction, a length direction and a height direction, a clip height greater than a clip width and less than a clip length, and comprising an attachment feature extending from the first portion (20) in the height direction at least half of the clip height.

Example 10. The clip (11) of example 9, wherein the attachment extends from the second leg (30).

Example 11. The clip (11) of any one of the previous examples, wherein the first coupling element is provided by one of a hook (44) and a protrusion (46), and the second coupling element is provided by the other of the hook (44) and the protrusion (46).

Example 12. The clip (11) of any one of the previous examples, comprising a first bar (72) interconnecting the first portions (20) of multiple clips (11), and a second bar (74) interconnecting the second portions (22) of the multiple clips (11).

Example 13. A clip assembly comprising multiple clips (11) according to of any one of the previous examples, the assembly further comprising a sprue (68) interconnecting multiple clips (11) along a width direction, the sprue (68) configured to be removed during a clip manufacturing process.

Example 14. A wiring harness clip, comprising first and second portions (20, 22) joined to one another by a living hinge (24), a snap (42) including first and second coupling elements respectively provided on the first and second portions (20, 22), the first and second coupling elements decoupled from one another in an open clip position and coupled to one another in a closed clip position and wherein each of the first and second portions (20, 22) include a spring (52) facing one another, the springs (52) configured to clamp about a wiring in the closed clip position, wherein each spring (52) is characterized as having a trapezoidal shape with a minor parallel portion that is configured to engage the wiring (14).

Example 15. A wiring harness assembly comprising a wiring harness having multiple wires, each wire having a conductor (16) covered in insulation (18), the insulation (18) includes webbing (17) that interconnects the wires to one another, wherein each conductor (16) is formed of a solid, non-stranded conductive material and wherein each of the conductors (16) has a generally rectangular profile having a width and a height, wherein the width is at least twice the height and further comprising the clip (11) according to example 1 or 14.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A clip, comprising:
   first and second portions joined to one another by a living hinge;
   a snap including first and second coupling elements respectively provided on the first and second portions, the first and second coupling elements decoupled from one another in an open clip position and coupled to one another in a closed clip position;
   wherein at least one of the first and second portions define an elongated slot extending a length in a longitudinal direction and a width through a width of the clip, the length greater than the width, the elongated slot having an open end and a closed end, the open end accessible from the longitudinal direction with the first and second portions secured to one another in the closed clip position such that the open end remains unobstructed by the first and second portions in the longitudinal direction; and
   wherein at least one of the first and second portions include a spring, wherein the spring circumscribes a contiguous unbroken opening extending through the width in both the open clip position and the closed clip position, the opening defined in part by a resilient fixed beam structure with a flat portion having relief notches at its opposing ends, and wherein the flat portion of the resilient fixed beam structure is configured to clamp about a wiring in the closed clip position.

2. The clip of claim 1, wherein the clip is a unitary molded plastic structure.

3. The clip of claim 1, wherein each of the first and second portions include a respective spring with its opening to provide first and second springs respectively on the first and second portions with first and second openings respectively, wherein each of the first and second springs are provided by a respective resilient fixed beam structure.

4. The clip of claim 3, wherein the first and second openings define a trapezoidal shape.

5. The clip of claim 1, wherein each of the first and second portions is provided by a U-shaped portion comprising a first leg and an adjoining second leg such that each of the first and second portions have the elongated slot, and the spring is different than the first and second legs, each spring extending from inwardly from their respective first leg and spaced from their respective elongated slot.

6. The clip of claim 5, wherein the first legs define two parallel interior walls.

7. The clip of claim 5, wherein each of the first legs supports a first and second projection respectively extending to a first and second face, the first projections adjacent to the hinge, and the second projections adjacent to the snap, the first faces abutting one another in the closed clip position, and the second faces abutting one another in the closed clip position.

8. The clip of claim 7, wherein the relief notches are provided between the first and second projections and each of the springs.

9. The clip of claim 5, wherein the clip extends a width direction, a length direction and a height direction, the length direction corresponding to the longitudinal direction, a clip height greater than a clip width and less than a clip length, and comprising an attachment feature extending from the first portion in the height direction at least half of the clip height.

10. The clip of claim 9, wherein the first legs are thicker than the second legs in the height direction.

11. The clip of claim 5, comprising an attachment that extends from the second leg and is configured to secure the clip to a structure.

12. The clip of claim 1, wherein the first coupling element is provided by one of a hook and a protrusion, and the second coupling element is provided by the other of the hook and the protrusion.

13. The clip of claim 1, comprising a first bar interconnecting the first portions of multiple clips, and a second bar interconnecting the second portions of the multiple clips.

14. A clip assembly comprising multiple clips according to claim 1, the assembly further comprising a sprue interconnecting multiple clips along a width direction, the sprue configured to be removed during a clip manufacturing process.

15. A wiring harness assembly comprising:
    a wiring harness having multiple wires, each wire having a conductor covered in insulation, the insulation includes webbing that interconnects the wires to one another, wherein each conductor is formed of a solid, non-stranded conductive material and wherein each of the conductors has a profile having a profile width and a profile height, wherein the profile width is at least twice the profile height; and
    the clip according to claim 1.

* * * * *